United States Patent [19]

Gey et al.

[11] 3,998,793

[45] Dec. 21, 1976

[54] PROCESS FOR THE PRODUCTION OF LINEAR POLYESTERS

[75] Inventors: Werner Gey, Offenbach (Main); Wolfgang R. Langhauser, Bergen-Enkheim, both of Germany

[73] Assignee: Zimmer Aktiengesellschaft, Germany

[22] Filed: Mar. 6, 1975

[21] Appl. No.: 555,787

[30] Foreign Application Priority Data

Mar. 14, 1974 Germany .......................... 2412216

[52] U.S. Cl. .......................... 260/75 R; 260/75 M
[51] Int. Cl.² .......................... C08G 63/38
[58] Field of Search .............. 260/75 R, 75 P, 75 M

[56] References Cited

UNITED STATES PATENTS

| | | | |
|---|---|---|---|
| 3,028,366 | 4/1962 | Engle et al. | 260/75 P |
| 3,171,828 | 3/1965 | Isaacs et al. | 260/75 R |

FOREIGN PATENTS OR APPLICATIONS 951,213   3/1964   United Kingdom

*Primary Examiner*—Murray Tillman
*Assistant Examiner*—W. C. Danison, Jr.
*Attorney, Agent, or Firm*—Allegretti, Newitt, Witcoff & McAndrews

[57] ABSTRACT

An alkali metal hydrogen monoglycolphosphate is added to the reaction product of diethylene glycol and dimethyl terephthalate to arrest the ester-interchange reaction and nullify the action of the divalent metal salt catalyst. These phosphates are easy to handle and convert the catalyst to an inactive compound which does not adversely affect subsequent polycondensation of the diethylene glycol terephthalate.

3 Claims, No Drawings

PROCESS FOR THE PRODUCTION OF LINEAR POLYESTERS

The invention relates to a process for producing linear polyesters by ester interchange of a dialkyl ester of terephthalic acid with a glycol under ester-interchange conditions in the presence of a salt of a divalent metal acting as ester-interchange catalyst and by subsequent polycondensation under polycondensation conditions, in which there is added to the reaction mixture a phosphorus compound to arrest the reaction, after reaching a degree of ester interchange of at least 90%

THE PROBLEM

In the conventional ester-interchange process there are added to the reaction mixture, for the purpose of accelerating the reaction speed, salts of divalent metals as catalysts. Salts of the metals zinc, manganese and calcium have proved especially successful. The catalysts, however, bring about undesirable effects in the subsequent polycondensation: for example, the catalysis of thermooxidative decomposition, catalysis of the ester splitting, discoloring of the polycondensate and acceleration of the formation of glycol ethers.

PRIOR ART

In order to decrease or exclude the undesired effects of the catalyst in later process steps it is the practice to nullify the action of the catalysts by adding phosphorus compounds to the reaction mixture after the ester interchange, which phosphorus compounds react with the catalysts to produce inactive compounds. Known inactivators include, for example, salts of phosphoric acid and neutral esters of these acids as well as analogous compounds of phosphorous acid and phosphoric acid.

Among the neutral phosphorous acid esters, trinonylphenylphosphite plays a preferred role, and serves principally as a blocking agent for zinc catalysts. The blocking or inactivating action of arylphosphites, however, is a slowly proceeding reaction which continues over several intermediate stages, the first stage is the hydrolysis of the phosphorous acid ester. The phosphorous acid thus liberated in the process reacts with the metal ions of the catalyst. Because of the time required to produce the phosphorous acid, it is expedient to add the blocking agent at a point in time at which the catalyst is still needed for the running of the ester-interchange reaction. In practice, however, aryl phosphites are added to the reaction mixture only after the course of the ester-interchange reaction and cannot, therefore, develop fully their blocking action.

A further disadvantage of the aryl phosphites lies in that the resulting metal phosphite compounds produce hardened deposits in the reactors, so that filter cloggings and other troubles occur in the subsequent processing, for example, in the spinning of polyester fibers. Highly undesirable, too, is the fact that aryl phosphites form phenols which in the glycol recovery step distill over together with the glycol and pass with the returned glycol back into the production process. In a continuous process the percentage constituent of the phenols gradually increases. Phenols are tolerable only in very small concentrations, below 0.1%, since they severely reduce the degree of ester-interchange and polycondensation. The aryl esters of phosphoric or phosphorous acid have, moreover, the effect that the liberated phenols, on the one hand, discolor the polycondensate and, on the other hand, make impossible or difficult the recovery of the excess or split-off glycol.

The neutral esters of the kind mentioned are, moreover, appreciably volatile under the operating conditions used during the polycondensation reaction, so that the approtioning of the inactivating agent in relation to the divalent metal ions cannot be controlled exactly. Too small an amount of inactivating agent results in incomplete inactivation, while in the case of an over-dosing, the quality of the end product is lowered by the high phenol concentration. The phenols liberated during the polycondensation reaction pass into the waste water and make expensive purification measures necessary.

It is also known that the color of polyesters can be improved by adding an alkali metal hydrogen phosphate to the reaction product after the ester interchange (U.S. Pat. No. 2,938,015). The prior known compounds have, to be sure, good inactivating effects in respect to the ester-interchange catalyst, but their use in production processes on an industrial scale runs into difficulties. The hydrogen phosphates mentioned are insoluble in glycol and the limited number of other suitable solvents. Consequently, it is difficult to feed the phosphates in accurate quantities to the reactor. It is virtually impossible to feed pulverulent substances in predetermined doses into a pressurized reactor. The requirement for accurate dosing, accordingly, appreciably restricts the scope of useable blocking agents. Compounds otherwise effective are excluded as unuseable.

THE INVENTION

The object of the invention is to provide blocking agents or inactivating agents for ester-interchange catalysts which consist of salts of divalent metals, which are easy to handle and to apportion, bring about a rapid and complete blocking of the catalyst, largely avoid deposits inside the reactors, lead to end products faultless in color, do not render difficult the recovery of the glycol and do not drag along into the reaction mixture any of the substances impairing the flow of the continuous process.

The solution to the problem posed was found, surprisingly, in the use of a hydrogen monoglycolphosphate of the general formula

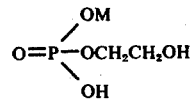

in which M is an alkali metal.

A preferred material is potassium hydrogen monoglycol phosphate, because the production of this compound is possible from an aqueous potassium compound.

The advantage of this blocking agent, first of all, is that it is soluble to about 30% by weight in glycol at room temperature and, consequently, is easy to apportion and to feed into the reactor.

In contrast to the other blocking agents, the alkali metal hydrogen monoglycolphosphate interrupts the ester-interchange reaction rapidly and completely. For this reason the addition can be made after termination of the ester-interchange reaction, so that impairment of the ester-interchange reaction is precluded. The carboxyl group content and the diethyleneglycol content in the polyester are less than with use of the known phosphorus compounds. The blocking agent of the invention can be distributed extremely homogeneously in the reaction product, so that the crystalline reaction product falls out with the ester-interchange catalyst homogeneously distributed in extremely fine particle size and not in troublesome accumulations in the melt.

The alkali metal hydrogen monoglycol phosphate is added to the ester-interchange or esterification mixture in a quantity of from 1 to 15, preferably 2 to 10, times the stochiometric amount required to react with the weight of the ester-interchange catalyst or esterification catalyst in the reaction mixture.

The other process parameters both for the ester-interchange and for the polycondensation are not affected by the choice of the new blocking agent, at least not appreciably.

EXAMPLES

Under the following fundamental process conditions a linear high-polymer polyester was produced from ethylene glycol and dimethyl terephthalate: The reactants were used at a molar ratio of 2.2 at a temperature of 150° C, which was raised within 2.5 hours to 225° C. The catalyst system consisted of 0.03% ZnAc$_2$ . 2H$_2$O and 0.02% Sb in the form of Sb$_2$O$_3$ with respect to the weight of dimethyl terephthalate. The polycondensation was carried out within 2 hours at a temperature of 275° C. and a vacuum of 0.1 Torr.

The tests differed as follows: In Test No. 1 (comparative test) there was added to the reaction mixture trinonylphenylphosphite in the indicated amount and at the point in time mentioned. In tests No. 2 to No. 6 there was added the potassium hydrogen monoglycol phosphate according to the invention at different points in time. The test data and results are summarized in the following table. From these it is clear that the addition of the blocking agent at the commencement of the polycondensation leads to optimal results. An addition at the beginning of the ester-interchange phase allows virtually no reaction to occur, indicating the effectiveness of the blocking agent (test No. 2).

TABLE

| Test No. | Addition amount (wt. % based on DMT) | Time point of addition | Degree of ester-interchange α % | COOH (10$^{-6}$ eq/g) | ALPHA No. | DEG (% by wt.) |
|---|---|---|---|---|---|---|
| 1 | 0.15 | III | 99.4 | 9.8 | 40 | 1.3 |
| 2 | 0.38 | I | — | — | — | — |
| 3 | 0.38 | II | 97.0 | 3.3 | 20 | 1.0 |
| 4 | 0.38 | | 99.4 | 4.3 | 20 | 1.0 |
| 5 | 0.26 | III | 99.6 | 4.8 | 20 | 1.0 |
| 6 | 0.10 | III | 99.6 | 6.2 | 20 | 1.1 |

Legends: 
I: Commencement of ester interchange.
  = at 200° C no reaction
II: End of ester interchange
III: Start of polycondensation

What is claimed is:

1. Process for the production of linear polyesters by ester interchange of a dialkyl ester of terephthalic acid with a glycol under ester-interchange conditions in the presence of a salt of a divalent metal acting as ester-interchange catalyst and by subsequent polycondensation, in which there is added to the reaction mixture in a quantity of from 1 to 15 times the stochiometric amount required to react with the amount of said catalyst present in the reaction mixture as catalyst inactivator, after reaching an ester-interchange degree of at least 90%, a hydrogen monoglycolphosphate compound of the general formula

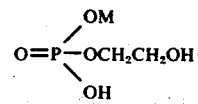

M being an alkali metal

2. Process according to claim 1, in which said alkali metal is potassium.

3. Process according to claim 1, characterized in that the alkali metal hydrogen monoglycol phosphate is added to the ester-interchange mixture in a quantity of from 2 to 10 times the stochiometric amount required to react with the amount of said catalyst present in the reaction mixture.

* * * * *